United States Patent Office 3,078,258
Patented Feb. 19, 1963

3,078,258
SULFUR VULCANIZATION OF RUBBERS WITH A 2 - (3,5 - DIMETHYL - 4 - MORPHOLINYLMERCAPTO)-BENZOTHIAZOLE ACCELERATOR
Marion W. Harman, Nitro, W. Va., assignor to Monsanto Chemical Company, St. Louis, Mo., a corporation of Delaware
No Drawing. Filed Sept. 8, 1958, Ser. No. 759,409
5 Claims. (Cl. 260—79.5)

This invention relates to accelerating the vulcanization of rubber. More particularly, the invention relates to rubber compositions containing 2-(3,5-dimethyl-4-morpholinylmercapto)benzothiazole and to accelerating vulcanization therewith.

Sulfenamide accelerators possess the important attribute of delayed action whereby rubber compositions can be compounded which vulcanize rapidly at vulcanization temperature but are free from any tendency to vulcanize at processing temperature. The need for accelerators which possess even greater processing safety has been intensified by use of furnace carbon blacks since these blacks do not possess the retarding properties inherent with channel black.

It is an object of this invention to provide a vulcanization accelerator having more delayed action than accelerators heretofore available. A further object is to provide accelerators which exert a powerful accelerating action at curing temperatures. A further particular object is to provide a means for safely processing vulcanizable stocks containing a furnace black. Other and further objects will be apparent from the detailed description following.

In accordance with this invention it has been found that 2 - (3,5-dimethyl-4-morpholinylmercapto)benzothiazole is a powerful accelerator of vulcanization and has little tendency to cure below vulcanizing temperatures. The preparation and properties of the compound are described in detail below.

EXAMPLE 1

A solution of the sodium salt of 2-mercaptobenzothiazole was prepared by mixing 43 grams (0.25 mole) of 97% 2-mercaptobenzothiazole, 40 grams (0.25 mole) of 25% sodium hydroxide and 50 grams of water. After stirring to dissolve, 115 grams (1.0 mole) of 3,5-dimethylmorpholine, B.P. 143–146° C., was added in 15 minutes at 20–25° C. and the mixture stirred for another 15 minutes. There was then added 42 ml. (0.125 mole) of 25% sulfuric acid while maintaining the temperature at 20–25° C. After 15 minutes additional stirring, and at 25–33° C. there was added over a period of 90 minutes 150 ml. (0.30 mole) of sodium hypochlorite solution containing 15.02 grams of sodium hypochlorite per 100 ml. The mixture was stirred at 30–32° C. for an hour longer and the excess hypochlorite destroyed by the addition of 4 grams of sodium sulfite. The product was cooled to 20° C., dissolved in 300 ml. of ether and the insoluble solid removed by filtration. The ether solution was washed with water and dried over sodium sulfate. The ether was removed in vacuo. The 2-(3,5-dimethyl-4-morpholinylmercapto)benzothiazole so obtained was a brown resinous product analyzing 9.7% nitrogen as compared to 10.0% calculated for $C_{13}H_{16}N_2OS_2$.

The powerful accelerating properties as well as the marked delayed action of the product is illustrated by comparison to the commercial delayed action accelerator 2-(4-morpholinylmercapto)benzothiazole. Further to increase the processing safety it is known to use sulfenamide accelerators in conjunction with a nitrosoamine retarder. Comparing sulfenamide accelerators in a stock without a retarder is not necessarily indicative of their relative merit in the presence of a nitrosoamine retarder. Significantly, the new accelerators outstandingly increase processing safety in stocks containing a nitrosoamine retarder. The nitrosoamine retarders are well known to rubber compounders. Examples are N-nitroso-N-phenyl-beta - naphthylamine, N - nitroso - 1,2-dihydro-2,2,4-trimethylquinoline, N-nitroso-6-ethoxy-1,2-dihydro-2,2,4-trimethylquinoline, nitrosated N-cyclohexyl-N'-phenyl-p-phenylenediamine and N-nitrosodiphenylamine.

Elemental sulfur ordinarily constitutes the vulcanizing agent but sulfur vulcanizing agents include organic compounds which contain sulfur that becomes available for cure upon incorporating the compound into rubber and heating the mixture. Various N,N'-thioamines are known to be vulcanizing agents, as for example N,N'-dithiobismorpholine, and may be used in the practice of the invention. In general, any sulfur vulcanizing agent is suitable whether in the form of elemental sulfur or selenium or in the form of a sulfur compound which releases sulfur at vulcanizing temperature. The sulfur level can be varied to achieve particular objectives. The delayed action accelerator may be used alone or in combination with other accelerators, as for example diphenyl guanidine, di-o-tolyl guanidine and diphenylguanidine phthalate. For most purposes the accelerators of the invention will be used in amounts within the range of 0.1–5% of the rubber.

Evaluation was carried out in base formulations comprising

| Stock | A | B | C | D |
|---|---|---|---|---|
| | Parts by weight | | | |
| Smoked sheets rubber | 100 | 100 | 100 | 100 |
| Carbon black | 50 | 50 | 50 | 50 |
| Zinc oxide | 5 | 5 | 5 | 5 |
| Stearic acid | 3 | 3 | 3 | 3 |
| Saturated hydrocarbon softener | 3 | 3 | 3 | 3 |
| Sulfur | 2.5 | 2.5 | 1.0 | 0.8 |
| N,N'Dinitroso-N,N'-diphenyl-p-phenylenediamine | | 1.5 | 1.5 | 1.5 |
| Dicyclohexylamine | | | 1.0 | 1.0 |

One of the furnace carbon blacks was used in the formulations. As stated previously, these blacks lack the inherent retarding action of channel blacks. The processing safety of the base stocks containing the test compound was evaluated by heating in a Mooney plastometer. The time in minutes required for the plasticity to increase 10 points above the minimum was determined. These values, commonly known to "Mooney Scorch Times," are a measure of processing safety, higher times indicating greater processing safety. The results are recorded below:

Table I

| Base Stock | Amount of Accelerator | Temp. of Heating, ° C. | Mooney Scorch Time in Minutes | |
|---|---|---|---|---|
| | | | 2-(4-morpholinylmercapto)-benzothiazole | 2-(3,5-dimethyl-4-morpholinylmercapto)-benzothiazole |
| A | 0.5 | 135 | 10.3 | 11.0 |
| B | 0.5 | 135 | 17.6 | 20.8 |
| C | 1.0 | 135 | 13.9 | 18.6 |
| D | 1.5 | 135 | 13.8 | 19.8 |

The base stocks containing the test accelerators were vulcanized in the usual manner by heating in a press for different periods of time at 144° C. The physical properties of the cured rubber products are set forth below:

Table II

| Base Stock | Amount of Accelerator | Cure Time in Minutes | 2-(4-morpholinyl-mercapto)-benzothiazole | | 2-(3,5-dimethyl-4-morpholinyl mercapto)-benzothiazole | |
|---|---|---|---|---|---|---|
| | | | 300% Modulus | Tensile at Break | 300% Modulus | Tensile at Break |
| A | 0.5 | 30 | 2,233 | 3,693 | 2,173 | 3,600 |
| | | 45 | 2,246 | 3,523 | 2,276 | 3,550 |
| | | 60 | 2,270 | 3,526 | 2,253 | 3,366 |
| B | 0.5 | 30 | 2,160 | 3,946 | 1,853 | 3,793 |
| | | 45 | 2,330 | 3,686 | 2,273 | 3,773 |
| | | 60 | 2,116 | 3,640 | 2,280 | 3,703 |
| C | 1.0 | 30 | 2,070 | 3,910 | 1,990 | 3,840 |
| | | 45 | 2,120 | 3,870 | 1,930 | 3,810 |
| | | 60 | 1,980 | 3,850 | 2,010 | 3,800 |
| D | 1.5 | 30 | 1,810 | 3,917 | 1,960 | 3,860 |
| | | 45 | 1,810 | 3,850 | 2,100 | 3,800 |
| | | 60 | 1,810 | 3,810 | 2,270 | 4,290 |

The process of the invention is advantageous for use with any of the sulfur vulcanizable diene rubbers. This class of rubbers contains a diene hydrocarbon in the polymer structure which contributes unsaturation and sulfur vulcanizability. They include styrene-butadiene copolymer rubbers, polybutadiene, natural rubber, synthetic polyisoprene. Delayed action accelerators are important for use in vulcanizing rubbers in which a diene hydrocarbon contributes a major proportion of the polymer but accelerate vulcanization of isobutylene polymerized in the presence of a small amount of a diene hydrocarbon (Butyl rubber). Similar advantages from the two methyl groups adjacent to the nitrogen in the morpholine ring are observed with compounds containing halogen, alkyl or phenyl substituents in the benzene ring of the benzothiazolyl radical as for example, 2-(3,5-dimethyl - 4 - morpholinylmercapto) - 4 - methylbenzothiazole, 2-(3,5-dimethyl-4-morpholinylmercapto)-5-chlorobenzothiazole and 2-(3,5-dimethyl-4-morpholinylmercapto)-4-phenylbenzothiazole.

It is intended to cover all changes and modifications of the examples of the invention herein chosen for purposes of disclosure which do not constitute departures from the spirit and scope of the invention.

What is claimed is:

1. A method of vulcanizing a sulfur vulcanizable diene hydrocarbon rubber which comprises mixing the rubber with a sulfur containing vulcanizing agent, accelerating amount of a compound selected from the group consisting of 2-(3,5-dimethyl-4-morpholinylmercapto)-benzothiazole, 2-(3,5-dimethyl-4-morpholinylmercapto) chloro-substituted benzothiazole, 2-(3,5-dimethyl-4-morpholinylmercapto) lower alkyl substituted benzothiazole and 2-(3,5-dimethyl-4-morpholinylmercapto)-phenyl substituted benzothiazole, and heating the mixture at vulcanizing temperature.

2. A method of vulcanizing a sulfur vulcanizable diene hydrocarbon rubber which comprises mixing the rubber with a sulfur containing vulcanizing agent and accelerating amount of 2-(3,5-dimethyl-4-morpholinylmercapto)-benzothiazole and heating the mixture at vulcanizing temperature.

3. A method of vulcanizing a sulfur vulcanizable diene hydrocarbon rubber which comprises mixing the rubber with a sulfur containing vulcanizing agent, a nitrosoamine retarder and accelerating amount of 2-(3,5-dimethyl-4-morpholinylmercapto)benzothiazole and heating the mixture at vulcanizing temperature.

4. A cured rubber product obtained by the method of claim 1.

5. A composition obtained by mixing a sulfur vulcanizable diene hydrocarbon rubber with a sulfur containing vulcanizing agent, a nitrosoamine retarder and accelerating amount of 2-(3,5-dimethyl-4-morpholinylmercapto)benzothiazole.

References Cited in the file of this patent
UNITED STATES PATENTS

| 2,437,170 | Minich | Mar. 2, 1948 |
| 2,582,857 | Brooks | Jan. 15, 1952 |
| 2,651,625 | Zerbe | Sept. 8, 1953 |
| 2,816,881 | Sullivan | Dec. 17, 1957 |
| 2,849,425 | Alliger | Aug. 26, 1958 |
| 2,871,239 | D'Amico | Jan. 27, 1959 |